United States Patent [19]
Groh

[11] 3,874,400
[45] Apr. 1, 1975

[54] QUICK OPENING VALVE OPERATED BY EXPLOSIVE MEANS

[75] Inventor: Max Groh, Unterpfaffenhofen, Germany

[73] Assignee: Messerschmitt-Bolkow-Blohm GmbH, Munich, Germany

[22] Filed: May 11, 1973

[21] Appl. No.: 359,255

[30] Foreign Application Priority Data
May 18, 1972 Germany.............................. 2224288

[52] U.S. Cl....................... 137/68, 137/70, 137/71, 220/89 A
[51] Int. Cl......................... F16k 13/06, F16k 17/40
[58] Field of Search................... 137/68, 69, 70, 71; 220/89 A; 222/3

[56] References Cited
UNITED STATES PATENTS

| | | | |
|---|---|---|---|
| 2,966,163 | 12/1960 | Nylin | 137/68 |
| 2,997,051 | 8/1961 | Williams | 137/68 |
| 3,013,571 | 12/1961 | Fulton | 137/68 |
| 3,027,903 | 4/1962 | Thorp, Jr. | 137/68 |
| 3,122,154 | 2/1964 | Siebel et al. | 137/68 |

*Primary Examiner*—Alan Cohan
*Assistant Examiner*—George L. Walton
*Attorney, Agent, or Firm*—Woodhams, Blanchard and Flynn

[57] ABSTRACT

Quick opening valve operable by explosive means. A body section defines a central generally cylindrical chamber into which are connected inlet and outlet openings, same communicating with the chamber in axially spaced relationship with each other. An inwardly extending flange defining a valve seat is positioned within said chamber on the axial side of one of said openings remote from the other of said openings. A combustion chamber communicates with said central opening at an end thereof on the side of said flange remote from said openings. A first valve including a rupturable membrane is rigidly positioned in gas-tight relationship with said body member between said openings. A second valve including a rupturable membrane is positioned in gas-tight relationship with said body member between said flange and said combustion chamber. Said second valve has a conical portion projecting toward and shaped for close fitting with said valve seat. A valve rod connects said two valves. Thus, the openings are separated from each other in a gas-tight manner and all of said valve can be evacuated without affecting its operability. Firing of an explosive charge within said combustion chamber acts on said second valve unit to drive said first valve past both of said openings and to drive said projection into said valve seat, the force of the engagement between said projection and said valve seat effecting a cold welding therebetween whereby said openings now remain permanently in communication with each other.

8 Claims, 1 Drawing Figure

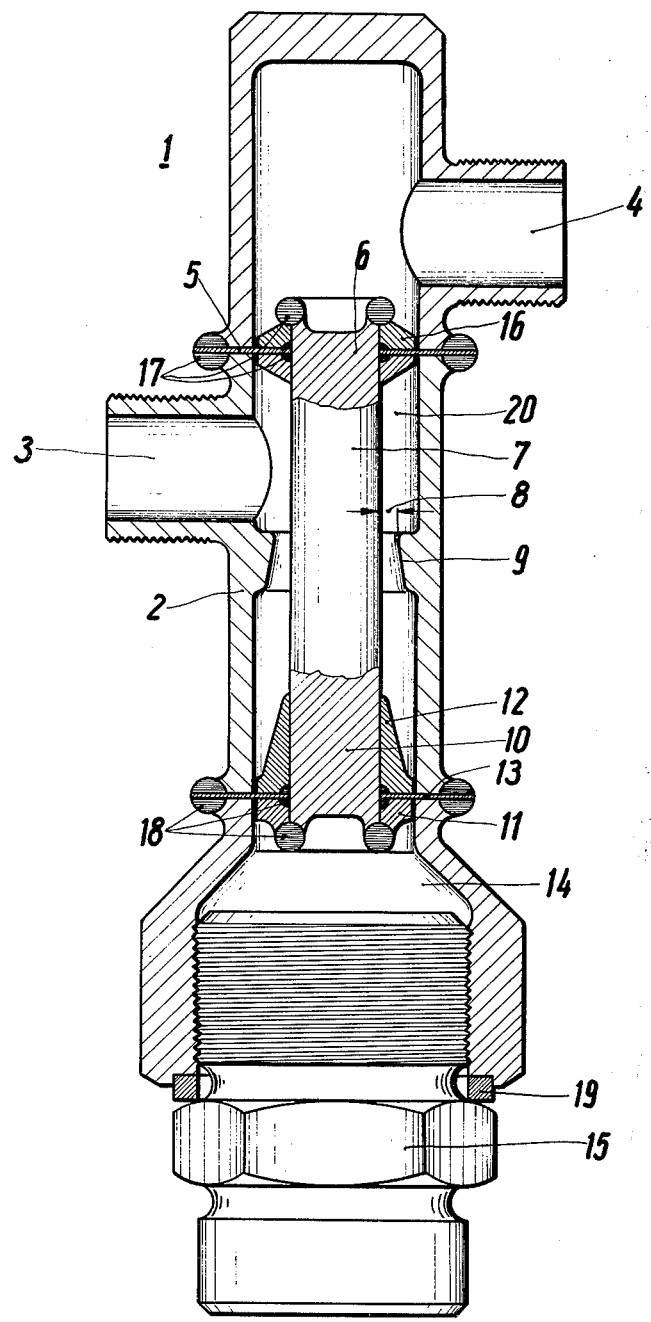

QUICK OPENING VALVE OPERATED BY EXPLOSIVE MEANS

FIELD OF THE INVENTION

The invention relates to a quick opening valve, particularly a valve for use in space travel, which is operated by explosive means.

BACKGROUND OF THE INVENTION

The basic purpose of the invention is to develop, particularly for purposes of space travel, a relatively light and quickly acting valve of high reliability which is simple to manufacture and the cavities of which can be evacuated. Further, the valve cavities connected to the inlet and outlet openings of the valve must be closed off absolutely tightly to the outside in both the closed and open valve positions.

For a quick opening valve which is operated by explosive means and has in a cylinder axially arranged side-by-side inlet and outlet openings, these purposes are attained according to the invention by arranging between the inlet and outlet openings a rupturable membrane which divides the cylinder chamber, which rupturable membrane is connected to one end of a piston rod which extends with clearance through a conically-shaped inner flange defining a seat arranged in the axial direction ahead of the inlet opening in the cylinder. Said piston rod at its other end has a piston with a conical projection corresponding to the seat defined by the conically shaped inner flange. Adjacent such projection the cylinder is again divided by means of a further rupturable membrane and the cylinder has a combustion chamber axially in front of the piston which can be subjected to pressure by means of an explosive charge.

In an advantageous further development of the invention, the piston rod is provided on both ends with pistons of equal diameter, through which the resulting double piston is pressure balanced.

When the valve is closed the pressure of the inlet medium accumulates in the structure thus far described in a cavity which is wholly gas-tight because according to a further development of the invention the two rupturable membranes are secured to the cylinder and the piston rod by means of gas-tight welds.

After operation of the valve, namely in its open position, a gas-tight closure of the combustion chamber with respect to the cylindrical chamber is achieved according to a further development of the invention by causing the explosive charge to be of sufficient magnitude to effect rupture of the two rupturable membranes and a self-locking or a welding of the conical projection to the seat defined by the conically shaped inner flange. Due to the friction which generated between the conical projection and the conically shaped inner flange, both a dampening attenuation of the effect of the explosive charge and a cold welding of the conical fit projection to the conical inner flange are secured.

One exemplary embodiment of the invention is illustrated in the drawing. The FIGURE illustrates in a longitudinal cross-sectional view a quick opening valve 1 which is operated by explosive means. In said valve there are arranged in a cylinder 2 axially spaced relationship an inlet opening 3 and an outlet opening 4. The cylinder 2 is divided between said openings by a rupturable membrane 5. One end 6 of a piston rod 7 and a piston 16 are secured to said rupturable membrane 5, and all connections 17 between the cylinder 2 of the rupturable membrane 5, the piston 16 and the piston rod 7 are made by welding 17. The piston rod 7 extends with a suitable clearance 8 through the seat defined by the conically shaped inner flange 9 of the cylinder 2 and is provided at its other end 10 with a piston 11 which has a conical projection 12. The part of the cylinder chamber 20 which is connected to the inlet opening 3 is closed by a further rupturable membrane 13, wherein again all connections are made gas-tight by appropriate welding 18. A combustion chamber 14 is positioned ahead of the cylinder chamber 20. An explosive charge 15 (which is arranged in a commercial cartridge provided with an electrical ignition device which cannot be seen in the drawing) is screwed to the housing 2 of the valve 1 with the interposition of a gasket 19.

The valve is distinguished in that its cavities which are connected to the inlet opening 3 and the outlet opening 4 can be evacuated if necessary and are absolutely gas-tight to the outside.

Upon ignition of the explosive charge 15 a pressure is created in the combustion chamber 14 which separates the rupturable membranes 5 and 13. The two pistons 11 and 6 and the piston rod 7 move under the pressure so generated in the combustion chamber 14 upwardly from the position of the valve illustrated in the drawing until the conical projection 12 of the piston 11 engages the seat provided by the conically shaped inner flange 9 of the cylinder 2 to frictionally oppose the force acting on the piston rod and to seal the cylinder chamber 20 from the combustion chamber 14 by self-locking or cold welding. Both pistons 11 and 16 and the piston rod 7 are now held in their upper end position and a free passage between the inlet opening 3 and the outlet opening 4 is thereby provided.

The embodiments of the invention in which an exclusive property or privilege is claimed are defined as follows:

1. An explosive actuated valve, comprising:
   an elongated and hollow valve body having means defining an inlet opening, means defining an outlet opening and means defining a combustion chamber thereon all communicating with the interior of said hollow valve body;
   a piston rod movably mounted in said interior of said valve body;
   means defining a pair of rupturable membranes secured to said piston rod and located on opposite sides of said inlet opening and means for securing each of said membranes to said valve body so that said piston rod is held immovably in said hollow valve body whereby a pressure present in said inlet opening will be balanced on said piston rod and on said rupturable membranes; and
   an explosive charge mounted in said combustion chamber at one end of said piston rod, a detonation of said explosive charge offsetting the pressure balance on said piston rod and effecting a rupturing of both of said rupturable membranes and a simultaneous shifting of said piston rod.

2. The explosive actuated valve according to claim 1, including means defining a tapered surface secured to said piston rod and means defining a tapered opening larger in diameter than said piston rod encircling said piston rod between said inlet opening and said combustion chamber and adapted to receive said tapered surface therein subsequent to a detonation of said explosive charge to thereby seal said inlet and outlet openings from said combustion chamber.

3. The explosive actuated valve according to claim 2, wherein the force created by said detonation of said explosive charge is sufficient to drive said tapered surface into said tapered opening to form a locking engagement therein.

4. The explosive actuated valve according to claim 2, wherein said means defining a tapered opening includes an inwardly extending flange in said hollow valve body, said flange having a surface thereon defining said tapered opening.

5. The explosive actuated valve according to claim 2, including a pair of pistons mounted on said piston rod adjacent said rupturable membranes; and
wherein said pistons are of the same diameter.

6. The explosive actuated valve according to claim 5, wherein said rupturable membranes are secured to each of said pistons.

7. The explosive actuated valve according to claim 6, wherein said rupturable membranes are secured by gas-tight welds to said valve body and said pistons.

8. The explosive actuated valve according to claim 1, wherein said explosive actuated valve is normally closed;
wherein said inlet opening to said interior is located on said valve body between the locations where said outlet opening and said combustion chamber open to said interior;
whereby said detonation effects an offsetting of said pressure balance, a rupturing of both of said rupturable membranes and a simultaneous shifting of said piston rod toward said outlet opening to bring said inlet opening into communication with said outlet opening.

* * * * *